United States Patent
Meier et al.

(10) Patent No.: US 7,514,508 B2
(45) Date of Patent: Apr. 7, 2009

(54) PROCESS FOR THE POLYMERIZATION OF ETHYLENE

(75) Inventors: Gerben Meier, Frankfurt (DE); Massimo Covezzi, Ferrara (IT); Pietro Baita, Rovigo (IT); Gabriele Mei, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 263 days.

(21) Appl. No.: 10/568,739

(22) PCT Filed: Jul. 19, 2004

(86) PCT No.: PCT/EP2004/008063

§ 371 (c)(1),
(2), (4) Date: Feb. 17, 2006

(87) PCT Pub. No.: WO2005/019280

PCT Pub. Date: Mar. 3, 2005

(65) Prior Publication Data

US 2007/0093621 A1    Apr. 26, 2007

Related U.S. Application Data

(60) Provisional application No. 60/497,900, filed on Aug. 25, 2003.

(30) Foreign Application Priority Data

Aug. 20, 2003   (EP) .................................. 03077645

(51) Int. Cl.
*C08F 2/38*   (2006.01)
*C08F 2/34*   (2006.01)
*C08F 210/02* (2006.01)

(52) U.S. Cl. ........................ 526/65; 526/88; 526/348.5; 526/905

(58) Field of Classification Search ............ 526/65, 526/88, 348, 348.2, 348.3, 348.6, 905
See application file for complete search history.

(56) References Cited

U.S. PATENT DOCUMENTS

| 4,399,054 | A | | 8/1983 | Ferraris et al. ........... 252/429 B |
| 5,693,583 | A | * | 12/1997 | Hagerty et al. .............. 502/115 |
| 5,728,353 | A | * | 3/1998 | Govoni et al. ............... 422/145 |
| 6,221,982 | B1 | | 4/2001 | Debras et al. ................. 526/64 |
| 6,455,642 | B1 | | 9/2002 | Myhre et al. .................. 526/64 |
| 6,787,608 | B2 | * | 9/2004 | VanDun et al. ............. 525/240 |

FOREIGN PATENT DOCUMENTS

| EP | 0503791 | 9/1992 |
| EP | 0541760 | 5/1993 |
| EP | 1012195 | 6/2000 |
| EP | 1146077 | 10/2001 |

OTHER PUBLICATIONS

J. Yerushalmi, D. Geldart (Editor), "Chapter 7—High Velocity Fluidized Beds," *Gas Fluidization Technology*, J. Wiley & Sons Ltd., p. 155-195 (1986).

* cited by examiner

*Primary Examiner*—Fred M Teskin
(74) *Attorney, Agent, or Firm*—William R. Reid (57) ABSTRACT

Process for preparing a broad molecular weight polyethylene by polymerizing ethylene in the presence of a polymerization catalyst, the process comprising the following steps, in any mutual order:
a) polymerizing ethylene, optionally together with one or more α-olefinic comonomers having from 3 to 12 carbon atoms, in a gas-phase reactor in the presence of hydrogen,
b) copolymerizing ethylene with one or more α-olefinic comonomers having from 3 to 12 carbon atoms in another gas-phase reactor in the presence of an amount of hydrogen less than step a),
where in at least one of said gas-phase reactors the growing polymer particles flow upward through a first polymerization zone under fast fluidization or transport conditions, leave said first polymerization zone and enter a second polymerization zone through which they flow downward under the action of gravity.

20 Claims, 2 Drawing Sheets

Fig. 1

Fig. 2

PROCESS FOR THE POLYMERIZATION OF ETHYLENE

This application is the U.S. national phase of International Application PCT/EP2004/008063, filed Jul. 19, 2004, claiming priority to European Patent Application 03077645.4 filed Aug. 20, 2003, and the benefit under 35 U.S.C. 119(e) of U.S. Provisional Application No. 60/497,900, filed Aug. 25, 2003; the disclosures of International Application PCT/EP2004/008063, European Patent Application 03077645.4 and U.S. Provisional Application No. 60/497,900, each as filed, are incorporated herein by reference.

The present invention relates to a process for the gas-phase polymerization of ethylene, particularly to a gas-phase polymerization process for obtaining high density polyethylene (HDPE) endowed with broad molecular weight distribution, in particular multimodal molecular weight distribution. The obtained polyethylene is particularly suitable for producing items endowed with enhanced stress-crack resistance, such as pipes, blow and injection molded articles.

For polyolefins and for polyethylene in particular, the molecular weight (MW) and the molecular weight distribution (MWD) are fundamental characteristics affecting the physical, and in particular the mechanical properties of the polymer and thus its applications. It is generally recognized in the art that the higher the molecular weight, the higher the mechanical properties. However, polyolefins with a high molecular weight can be difficult to process, due to their poor flowability properties. The latter can be a serious disadvantage in all those applications requiring a rapid transformation at high shear-rate, for example in blowing and extrusion techniques. In order to improve the Theological properties, while maintaining superior mechanical properties of the final products, it is known in the art to broaden the molecular weight distribution of the polyethylene: the high molecular weight (HMW) fraction contributes to enhance the mechanical properties, the low molecular weight (LMW) fraction helps the processing of the polymer.

The molecular weight distribution can be completely defined by means of a curve obtained by gel permeation chromatography (GPC). Generally, the MWD is defined by a parameter, known as the dispersion index D, which is the ratio between the average molecular weight by weight ($M_w$) and the average molecular weight by number ($M_n$). The dispersion index constitutes a measure of the width of the MWD. For most applications, the dispersion index varies between 10 and 30.

Another parameter commonly used to define the molecular weight distribution is the ratio between melt index values obtained in different conditions. For instance, with relevance to HDPE for pipe or film application, a ratio between the melt index F (ASTM-D 1238, 190° C./21.6 Kg) and the melt index P (ASTM-D 1238, 190° C./5 Kg) higher than 22 is indicative of a significant broad molecular weight distribution.

Higher toughness, strength and stress-crack resistance are required for many high density polyethylene (HDPE) applications. In addition to these superior mechanical properties, it is important to keep under control production costs, by limiting the use of energy and by increasing the processing yields. High molecular weight HDPE having bimodal or multimodal MWD, i.e. the polymer has two or more distinct ranges of molecular weight, gives the best answer to the customers demand. This kind of polymers is particularly suitable for producing pipes, films, blow and injection molded articles.

It is well known in the art that an insuperable problem of non-homogeneity occurs when bimodality is obtained simply by melt blending low and high molecular weight ethylene polymers. Thus, other methods have been suggested: two reactors in series, eventually with different catalyst in each reactor, or a single reactor fed with a dual site catalyst. Unfortunately, different catalysts used in two conventional reactors in series still lead to polymers with a lack of homogeneity.

Processes with dual-site catalysts show drawbacks as well: in fact, it is very difficult to control the production split between the relatively low and relatively high molecular weight fractions. Furthermore, different catalysts are necessary for obtaining different products, so that a very low operational flexibility can be assured.

Chromium catalysts tend to broaden the MWD of polyolefins, and in some cases can produce bimodal distribution, but the low molecular weight fraction contains a minor amount of comonomer, which depresses the overall mechanical properties, and the stress-crack resistance in particular.

By using two reactors in series with Ziegler/Natta catalyst systems and tailoring the process conditions, it is possible to produce a wide range of high density polyethylene having a large MWD, and in particular a bimodal MWD. In fact, each reactor can work at different polymerization conditions, in terms of catalyst, pressure, temperature, monomer(s) and molecular weight regulator(s) concentration.

U.S. Pat. No. 6,221,982 discloses a process for producing HDPE in the presence of a Ziegler/Natta catalyst system in two liquid full loop reactors in series. In the first reactor ethylene is homopolymerized or copolymerized with an α-olefinic monomer comprising from 3 to 8 carbon atoms and, in a second reactor serially connected to the first reactor the product of the first reactor is copolymerized from ethylene and a $C_3$-$C_8$ α-olefinic comonomer. The process further requires adding a dehydrogenation step downstream the first reactor, so that a dehydrogenation catalyst is introduced into the reactants downstream the first reactor.

EP 0 503 791 describes a process for producing bimodal ethylene polymer compositions comprising a mixture of relatively high and low molecular weight polymers by means of two gas-phase, fluidized bed reactors in series. In order to maintain satisfactory processability, the polymer productivity is lowered in the first reaction and raised in the second one. The ethylene partial pressure in each reactor is set accordingly.

However, both the processes of U.S. Pat. No. 6,221,982 and EP 503791 lead to a final polymer having a poor homogeneity. In fact, in each reactor of said cascade-processes a different polymer is generated in term of molecular weight, chemical composition and crystallinity, so that the final polymer shows an intrinsic heterogeneity, caused by the residence time distribution. Depending on the residence time of the polymer particles in the sequence of the reactors, the polymer particles show a larger or a smaller core made of relatively low molecular weight polyethylene and a larger or a smaller outside made of relatively high molecular weight polyethylene (or vice versa). Critical is the homogeneity of the materials for blow-molding products, for films in particular, and for extrusion of pipes, in which the presence of even small quantities of non-homogeneous material brings about the presence of unfused particles (fish-eyes).

An improvement over the prior art is present in the applicant's earlier EP-B-1012195, wherein a process for gas-phase polymerization is described. The process is carried out in two interconnected polymerization zones, wherein the growing polymer particles flow through a first polymerization zone (riser) under fast fluidization conditions, leave said riser and enter a second polymerization zone (downcomer) through which they flow in a densified form under the action of gravity, leave said downcomer and are reintroduced into the riser, thus establishing a circulation of polymer between the two polymerization zones. A gas of composition different from that present in the riser is introduced in the downcomer, acting as a barrier to the gas mixture coming from the riser. By properly adjusting the polymerization conditions in said two polymerization zones, it is possible to produce a wide range of bimodal polymers, having an intimate relationship between low and high molecular weight polymer fractions, so that it is possible to achieve a broadening of the MWD, while at the same time increasing the level of homogeneity of the final polymer.

However, the disclosure of EP-B-1012195 does not teach how to obtain high density polyethylene (HDPE) suitable to produce articles having high stress cracking resistance. By way of an example, the proper HDPE for producing pipes is endowed with a broad molecular weight distribution, wherein the low molecular weight fraction is an ethylene homopolymer with high crystallinity and the high molecular weight fraction is modified with comonomer(s). Therefore, the polymerization should be carried out in such a way to incorporate the comonomer(s) only into the high molecular weight polyethylene fraction. Polymers endowed with such features cannot be obtained according to EP-B-1012195, since the comonomer fed to the downcomer, wherein high molecular weight polymer is produced, would inevitably enter the riser, wherein low molecular weight polymer is produced. Consequently, it is not possible to produce in the riser a high crystallinity, low molecular weight homopolymer.

Accordingly, there is a need of adapting the polymerization process of EP-B-1012195 to the preparation of a broad molecular weight distribution HDPE, overcoming the drawbacks of poor homogeneity of ethylene polymers obtained by the gas-phase processes known in the art, as above explained.

It has now been found a process for preparing a broad molecular weight polyethylene by polymerizing ethylene in the presence of a polymerization catalyst, the process comprising the following steps, in any mutual order:

a) polymerizing ethylene, optionally together with one or more α-olefin comonomers having from 3 to 12 carbon atoms, in a gas-phase reactor in the presence of hydrogen, b) copolymerizing ethylene with one or more α-olefin comonomers having from 3 to 12 carbon atoms in another gas-phase reactor in the presence of an amount of hydrogen less than step a), where in at least one of said gas-phase reactors the growing polymer particles flow upward through a first polymerization zone (riser) under fast fluidization or transport conditions, leave said riser and enter a second polymerization zone (downcomer) through which they flow downward under the action of gravity, leave said downcomer and are reintroduced into the riser, thus establishing a circulation of polymer between said two polymerization zones.

The process according to the present invention allows to obtain from step a) an ethylene polymer with a molecular weight lower than the ethylene copolymer obtained from step b). In particular, the final polymer comprises a high crystallinity, relatively low molecular weight ethylene polymer formed in step a), which is intimately mixed with a high molecular weight ethylene copolymer produced in step b). The polymerization process of the present invention allows to bond an increased amount of comonomer only to the relatively high molecular weight polymer fraction, thus obtaining ethylene polymers with enhanced mechanical properties and improved stress-crack resistance, in particular. A further advantage shown by the process of the present invention is that a more effective control of the molecular weight distribution can be achieved.

The stress cracking resistance of the ethylene polymers obtained by the process of the present invention can be evaluated by means of the full notch creep test (FNCT). The full notch creep test (FNCT) is used mainly in Europe by resin producers for development purposes. Depending on the selected test conditions, the rupture time can be strongly reduced with respect to other test methods, such that information can be obtained in a short time on highly resistant materials. The test equipment is simple, being the usual set-up for a tensile creep test. A sample of polymer is immersed in water or a specified surfactant solution at 80° C. or 95° C. This sample is notched on four sides perpendicularly to the stress direction and a constant load is applied to the sample. The time to rupture is recorded as a function of the applied stress. The ethylene polymers obtained by the process of the present invention show high values of rupture time, since a relatively high amount of comonomer is bond to the low molecular weight polyethyle-ne fraction.

According to the present invention the above physical-mechanical properties can be obtained carrying out the polymerization of ethylene in two serially interconnected gas-phase reactors. These reactors are described in EP-B-1012195 and are characterized by two interconnected polymerization zones, in which the polymer particles flow under different fluidization conditions and reactants compositions.

In the first polymerization zone (riser), fast fluidization conditions are established by feeding a gas mixture comprising one or more α-olefins at a velocity higher than the transport velocity of the polymer particles. The velocity of said gas mixture is preferably comprised between 0.5 and 15 m/s, more preferably between 0.8 and 5 m/s. The terms "transport velocity" and "fast fluidization conditions" are well known in the art; for a definition thereof, see, for example, "D. Geldart, Gas Fluidisation Technology, page 155 et seq., J. Wiley & Sons Ltd., 1986".

In the second polymerization zone (downcomer), the polymer particles flow under the action of gravity in a densified form, so that high values of density of the solid are reached (mass of polymer per volume of reactor), which approach the bulk density of the polymer. In other words, the polymer flows vertically down through the downcomer in a plug flow (packed flow mode), so that only small quantities of gas are entrained between the polymer particles.

According to a first embodiment of the present invention, a sequence of two gas-phase reactors with the above configuration is used. This means that in both said gas-phase reactors the growing polymer particles flow upward through a riser under fast fluidization or transport conditions, leave said riser and enter a downcomer through which they flow downward under the action of gravity, leave said downcomer and are reintroduced into the riser. According to a second embodiment of the present invention, the polymerization step a) is performed in a gas-phase fluidized bed reactor.

Preferably, the polymerization of ethylene to produce a relatively low molecular weight ethylene polymer (step a) is performed upstream the copolymerization of ethylene with an α-olefinic comonomer to produce a relatively high molecular weight ethylene copolymer (step b). To this aim, in step a) a gaseous mixture comprising ethylene, hydrogen and an inert gas is fed to a first gas-phase reactor. The polymerization is carried out in the presence of a highly active catalyst of the Ziegler-Natta or metallocene type. Preferably, no comonomer is fed to said first gas phase reactor and a highly crystalline ethylene homopolymer is obtained in step a). However, a minimal amount of comonomer may be fed with the proviso that the degree of copolymerization in step a) is limited so that the density of the ethylene polymer obtained in step a) is not less than 0.955 kg/dm$^3$, preferably not less than 0.960 kg/dm$^3$, otherwise the distinction between the relatively low molecular weight polymer produced in step a) and the relatively high molecular weight polymer produced in step b) is failed.

Hydrogen is fed in an amount depending on the catalyst system and, in any case, suitable to obtain in step a) an ethylene polymer with an average molecular weight between 20,000 and 60,000 g/mol and melt flow rate MIE (ASTM D1238, condition 190° C./2.16 Kg) in the range of 10 to 400 g/10 min, preferably 100 to 200 g/10 min. The melt flow rate, commonly referred to as melt index MI, is inversely indicative of the molecular weight of the polymer. In other words, a low melt index is indicative of a high molecular weight for the polyethylene, and vice versa. In order to obtain the above MIE range, in step a) the hydrogen/ethylene molar ratio is comprised between 0.5 and 5, preferably 1.0 and 3.0, the ethylene monomer being comprised from 5 to 50% by volume, preferably from 5 to 30% by volume, based on the total volume of gas present in the first polymerization reactor. The remaining portion of the feeding mixture is represented by inert gases and one or more $C_3$-$C_{12}$ α-olefin comonomers, if any. Inert gases which are necessary to dissipate the heat generated by the polymerization reaction are conveniently selected from nitrogen or saturated hydrocarbons, the most preferred being propane.

The operating temperature in the reactor of step a) is selected between 50 and 120° C., preferably between 80 and 100° C., while the operating pressure is between 0.5 and 10 MPa, preferably between 2.0 and 3.5 MPa.

The ethylene polymer obtained in step a) represents from 40 to 65% by weight, preferably from 45 to 55% by weight, of the total ethylene polymer produced in the overall process, i.e. in the first and second serially connected reactors.

The ethylene polymer coming from step a) and the entrained gas are then passed through a solid/gas separation step, in order to avoid the gaseous mixture coming from the first polymerization reactor from entering the reactor of step b) (second gas-phase polymerization reactor). Said gaseous mixture can be recycled back to the first polymerization reactor, while the separated ethylene polymer is fed to the reactor of step b). A suitable point of feeding of the polymer into the second reactor is on the connecting part between the downcomer and the riser, wherein the solid concentration is particularly low, so that the flow conditions are not negatively affected.

The operating temperature in step b) is in the range of 65 to 95° C., and the pressure is in the range of 1.5 to 4.0 MPa. The second gas-phase reactor is aimed to produce a relatively high molecular weight ethylene copolymer by copolymerizing ethylene with an α-olefinic comonomer comprising from 3 to 12 carbon atoms. Furthermore, in order to broaden the molecular weight distribution of the final ethylene polymer, the reactor of step b) can be conveniently operated by establishing different conditions of monomers and hydrogen concentration within the riser and the downcomer.

To this purpose, in step b) the gas mixture entraining the polymer particles and coming from the riser can be partially or totally prevented from entering the downcomer, so that to obtain two different gas composition zones. This can be achieved by feeding a gas and/or a liquid mixture into the downcomer through a line placed at a suitable point of the downcomer, preferably in the upper part thereof. Said gas and/or liquid mixture should have a suitable composition, different from that of the gas mixture present in the riser. The flow of said gas and/or liquid mixture can be regulated so that an upward flow of gas counter-current to the flow of the polymer particles is generated, particularly at the top thereof, acting as a barrier to the gas mixture entrained among the polymer particles coming from the riser. In particular, it is advantageous to feed a mixture with low content of hydrogen in order to produce the higher molecular weight polymer fraction in the downcomer. One or more comonomers can be fed to the downcomer of step b), optionally together with ethylene, propane or other inert gases. The comonomer may be selected from 1-butene, 1-pentene, 1-hexene, 4-methyl-1-pentene, 1-heptene and 1-octene. Preferably, the comonomer is selected from 1-butene, 1-hexene and 1-octene, more preferably the comonomer is 1-hexene.

The hydrogen/ethylene molar ratio in the downcomer of step b) is comprised between 0.005 and 0.2, the ethylene concentration being comprised from 1 to 20%, preferably 3-10%, by volume, the comonomer concentration being comprised from 0.3 to 5% by volume, based on the total volume of gas present in said downcomer. The rest is propane or similar inert gases. Since a very low molar concentration of hydrogen is present in the downcomer, by carrying out the process of the present invention is possible to bond a relatively high amount of comonomer to the high molecular weight polyethylene fraction.

The polymer particles coming from the downcomer are reintroduced in the riser of step b). Since the polymer particles keep reacting and no more comonomer is fed to the riser, the concentration of said comonomer drops to a range of 0.1 to 3% by volume, based on the total volume of gas present in said riser. In practice, the comonomer content is controlled in order to obtain the desired density of the final polyethylene. In the riser of step b) the hydrogen/ethylene molar ratio is in the range of 0.05 to 0.3, the ethylene concentration being comprised between 5 and 15% by volume based on the total volume of gas present in said riser. The rest is propane or other inert gases.

In the reactor of step b) a relatively high molecular weight polymer fraction is produced: the average molecular weight is comprised between 100000 and 1,000,000 g/mol, preferably between 300,000 and 600,000 g/mol.

As above described, two different compositions are present in said reactor of step b), so that it is possible to obtain the relatively high and very-high molecular weight polymer fractions.

The final polymer, discharged through a line placed in the bottom part of the downcomer of the second reactor, is the result of the polymerization in the reactors of step a) and step b). Accordingly, the polymerization process of the invention allows to obtain an ethylene polymer endowed with at least a tri-modal molecular weight distribution: relatively low, high and very-high molecular weights, obtained in the reactor of step a), in the riser of step b) and in the downcomer of step b), respectively.

According to a further embodiment of the present invention, it is possible to run the polymerization process so that also the reactor of step a) is operated by establishing different conditions of monomers and hydrogen concentration within the riser and the downcomer. Therefore, it is possible to feed the downcomer of step a) with a gas and/or a liquid having a composition different from that of the gas mixture present in riser. Advantageously, a mixture with a relatively low content of hydrogen can be fed to the upper part of said downcomer, in order to produce an ethylene polymer with an average molecular weight higher than that produced in the riser. In this case, step a) produces a bimodal polyethylene so that the final polymer is endowed with at least a quadrimodal MWD.

The polyethylene obtained by the process of the invention is characterized by a melt index MIF (ASTM D 1238, condition 190/21.6) in the range of 5 to 40 g/10 min, preferably 10 to 15 g/10 min, and a melt index MIP (ASTM D 1238, 190/5) in the range of 0.1 to 1 g/10 min, preferably 0.15 to 0.6 g/10 min, so that the MIF/MIP ratio is in the range of 20 to 50, preferably 25 to 40. As known, a similar range of MIF/MIP ratio is indicative of a polymer having a broad molecular weight distribution. Typically, the final polyethylene has a high density, comprised between 0.935 and 0.955 kg/dm$^3$, preferably between 0.945 and 0.952 kg/dm$^3$.

The process of the present invention will now be described in details with reference to the enclosed drawings, which are illustrative and not limitative of the scope of the claimed process.

Figure 1:
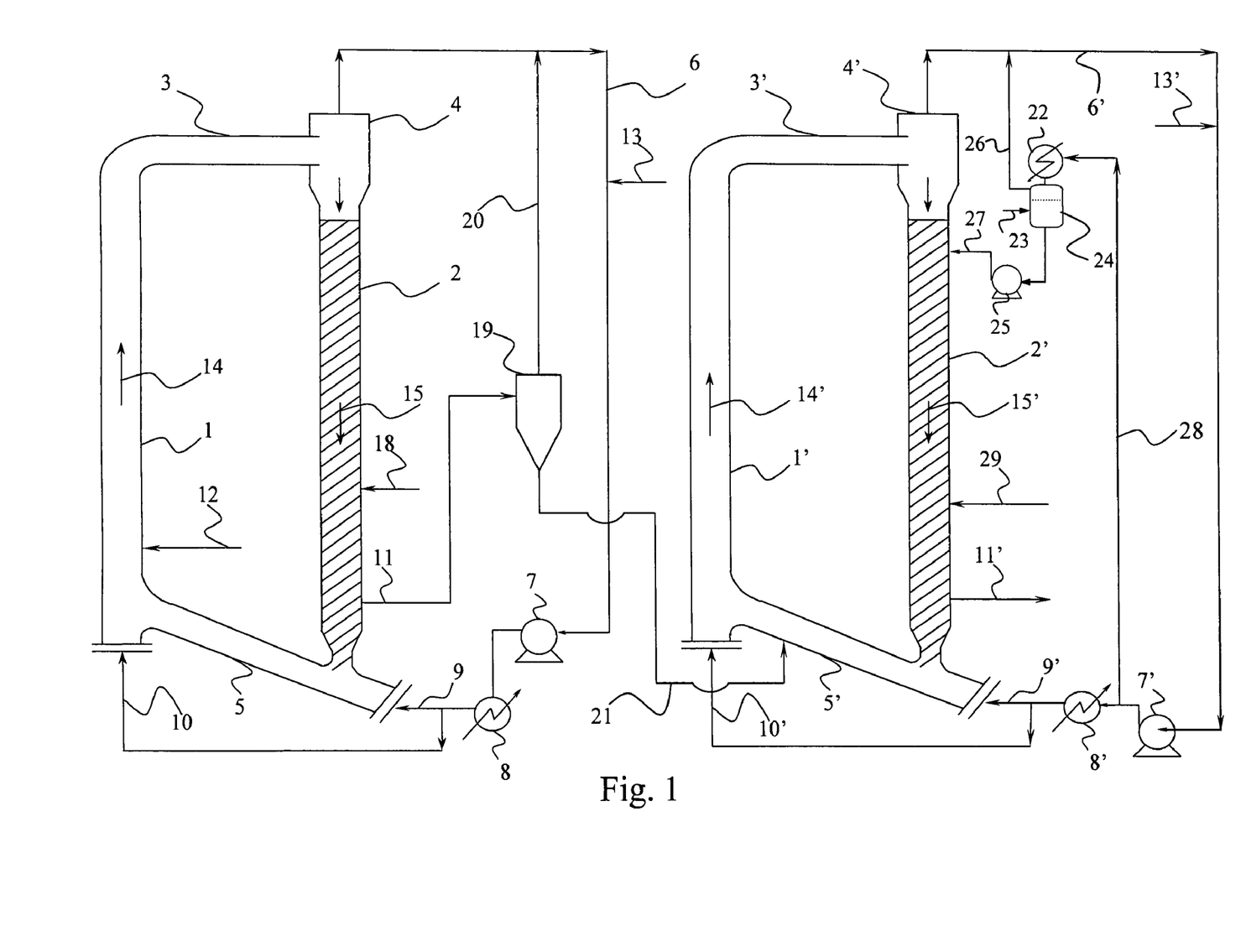

FIG. 1 shows the first embodiment of the present invention, where the gas-phase reactors of step a) and b) have interconnected polymerization zones. Moreover, step a) as above defined, is carried out before step b).

The first reactor (step a) comprises a riser 1 and a downcomer 2, wherein the polymer particles flow, respectively, upward under fast fluidization condition along the direction of the arrow 14 and downward under the action of gravity along the direction of the arrow 15. The riser 1 and the dowcomer 2 are appropriately interconnected by sections 3 and 5. In said first reactor ethylene is polymerized in the presence of hydrogen to produce a relatively low molecular weight ethylene homopolymer. To this aim, a gaseous mixture comprising ethylene, hydrogen and propane is fed to said first reactor through one or more lines 13, suitably placed at any point of the recycling system according to the knowledge of those skilled in art. A mixture of suitable composition comprising ethylene, propane (or other inert) and hydrogen is also fed to the downcomer 2 through one or more lines 18, so that a better control of the reactants composition in said zone can be achieved. The polymerization is carried out in the presence of a highly active catalyst system of the Ziegler-Natta or metallocene type. The various catalyst components are fed through line 12 to the riser 1 at the lower part thereof. After running through the riser 1, the polymer particles and the gaseous mixture leave the riser 1 and are conveyed to a solid/gas separation zone 4. The solid/gas separation can be effected by using conventional separation means such as, for example, a centrifugal separator (cyclone) of the axial, spiral, helical or tangential type.

From the separation zone 4, the polymer enters the downcomer 2. The gaseous mixture leaving the separation zone 4 is recycled to the riser 1 by means of a recycle line 6, equipped with means for the compression 7 and cooling 8.

A part of the gaseous mixture leaving the separation zone 4 can be transferred, after having been compressed and cooled, to the connecting section 5 via the line 9 to favor the transfer of polymer from the downcomer 2 to the riser 1, and to the bottom of the riser 1 through line 10 to establish fast fluidization conditions in the riser 1.

The polymer obtained in step a) is discharged from the lower part of the downcomer 2 and is fed through a line 11 to a solid/gas separator 19, in order to avoid the gaseous mixture coming from the first polymerization reactor from entering the reactor of step b). Said gaseous mixture is fed back to the recycle line 6 through line 20, while the separated ethylene polymer is fed to the second reactor.

The second reactor comprises a riser 1' and a downcomer 2', wherein the polymer particles flow, respectively, upward under fast fluidization conditions along the direction of the arrow 14' and downward under the action of gravity along the direction of the arrow 15'. The two polymerization zones 1' and 2' are appropriately interconnected by section 3' and 5'.

The ethylene polymer exiting the gas/solid separator 19 is fed through line 21 to the connecting section 5' of the second gas-phase reactor.

In said second gas-phase reactor ethylene is copolymerized with a comonomer in the presence of propane and hydrogen to produce a relatively high molecular weight ethylene copolymer. A gaseous mixture comprising ethylene, hydrogen and propane is fed to said second gas-phase reactor through one or more lines 13', suitable placed at any point of the recycle line 6' according to the knowledge of those skilled in art. Moreover, a gaseous mixture of suitable composition comprising ethylene and the comonomer is fed to the downcomer 2' through one or more lines 29, so that a better control of the reactants composition in said zone can be achieved.

Analogously to the first reactor, the growing polymer particles and the gaseous mixture leave the riser 1' and are conveyed to a solid/gas separation zone 4'.

From the separation zone 4', the polymer enters the downcomer 2', while the gaseous mixture is collected through line 6', compressed by means of the compression means 7' and split in two. A first part of said mixture is sent to the condenser 22 through line 28, where it is cooled to a temperature at which the monomers and the optional inert gas are partially condensed. The second part of said mixture is cooled by means of the cooling mean 8' and then fed to the connection zone 5' through line 9' and to the bottom of the riser 1' through line 10'. A separating vessel 24 is placed downstream the condenser 22. The separated gaseous mixture enriched in hydrogen is recirculated through line 26 to the recycle line 6'. On the contrary, the separated liquid is fed to the downcomer 2' through line 27. Said liquid can be fed to said downcomer 2' by gravity by placing the vessel 24 at a convenient height or by any suitable means, such as a pump 25.

The make-up components that must be present in the downcomer 2' in the amounts above stated can be fed in the liquid state directly into the vessel 24 via line 23.

Line 27 for feeding liquid is placed in the upper part of the downcomer 2' and allows to partially or totally prevent the gas mixture coming from the riser 1' from entering the downcomer 2', so as to obtain two different gas composition zones.

The final ethylene polymer resulting from the polymerization of step a) and b) is discharged via line 11'.

Figure 2:
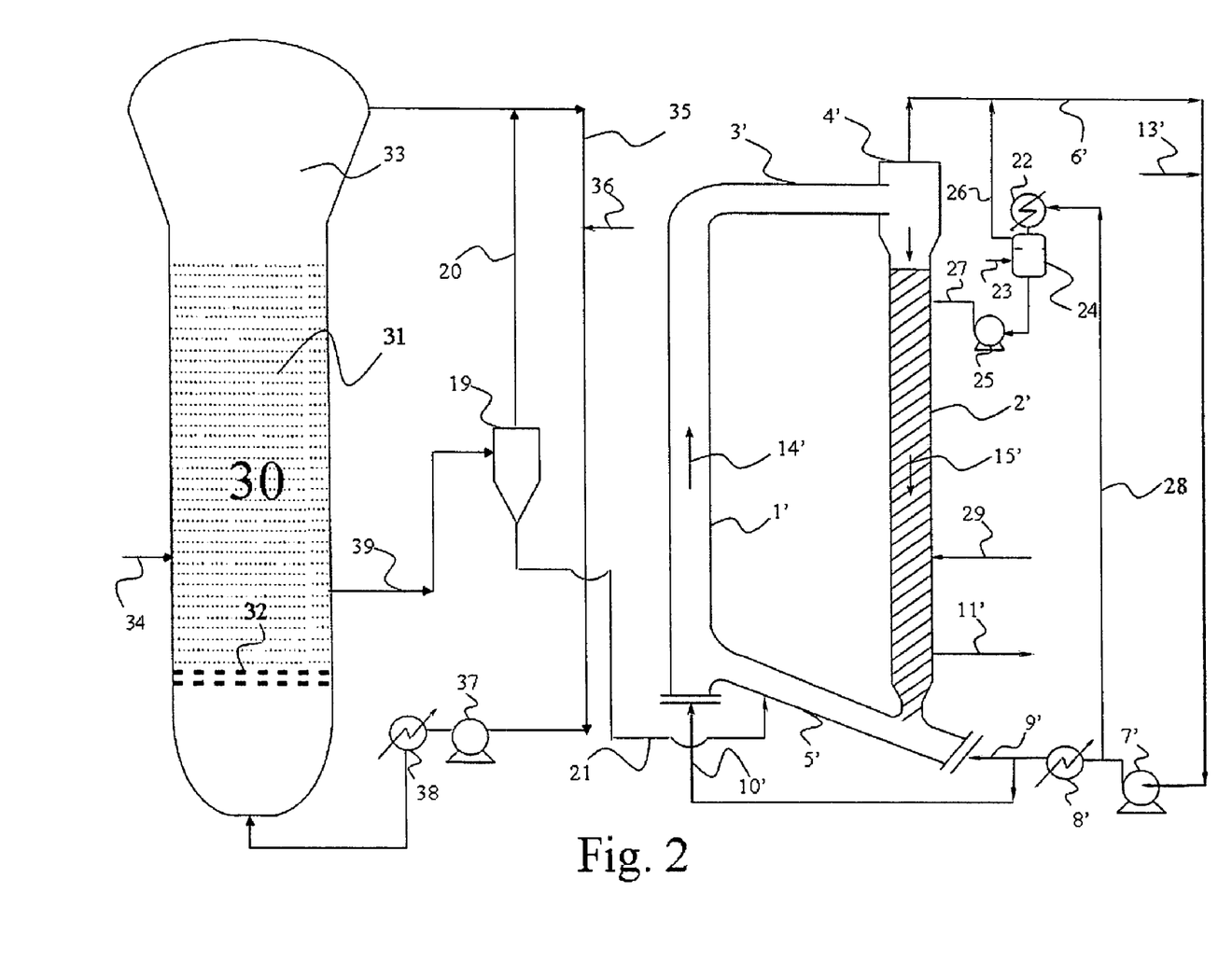

FIG. 2 shows a second embodiment of the present invention, according to which the polymerization step a) is performed in a fluidized bed reactor.

The fluidized bed reactor 30 of FIG. 2 comprises: a fluidized bed 31 of growing polymer particles, a fluidization plate 32 and a velocity reduction zone 33. The velocity reduction zone 33 is generally of increased diameter compared to the diameter of the fluidized bed portion of the reactor. The gaseous stream leaving the top of the velocity reduction zone 33 is transferred via the recycle line 35 to a compressor 37 and then to a heat exchanger 38. The recycle line 35 is equipped with a line 36 for feeding ethylene, hydrogen, inert gases and, optionally comonomers. Passing through the heat exchanger 38, the gaseous stream is cooled and then fed to the bottom of the fluidized bed reactor 30. In this way the upwardly flowing gas continuously maintains the bed of polymer particles 31 in fluidization conditions.

Generally, the various catalyst components are fed to the reactor through a line 34 that is preferably placed in the lower part of the fluidized bed 31.

The polymer obtained in step a) is discharged from the lower part of the fluidized bed 31 and is fed via line 39 to a solid/gas separator 19, in order to avoid the gaseous mixture coming from the first polymerization reactor from entering the reactor of step b). Said gaseous mixture is fed back to the recycle line 35 through line 20, while the separated ethylene polymer is fed via line 21 to the reactor of step b), which has the same arrangement already described in FIG. 1.

The polymerization process of the present invention can be carried out in the presence of a highly active catalyst system of the Ziegler-Natta or metallocene type.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_nX_{y-n}$ in which n is comprised between 0 and y; y is the valence of titanium; X is halogen and R is a hydrocarbon group having 1-10 carbon atoms or a COR group. Among them, particularly preferred are titanium compounds having an at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, tri-isobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form. As internal electron donor compounds can be selected among esters, ethers, amines, and ketones. In particular, the use of compounds belonging to 1,3-diethers, phthalates, benzoates and succinates is preferred.

Further improvements can be obtained by using, in addition to the electron-donor present in the solid component, an external electron-donor (ED) added to the aluminum alkyl co-catalyst component or to the polymerization reactor. These external electron donors can be selected among alcohols, glycols, esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the C2-C20 aliphatic ethers and in particular the cyclic ethers preferably having 3-5 carbon atoms, such as tetrahydrofurane (THF), dioxane.

Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate.

The preferred alkoxysilanes are of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl.

Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

It has been noticed that when the above ED compounds are added as a fresh reactant directly to the copolymerization step b), the best results are achieved in term of mechanical properties of the ethylene polymers obtained from the process of the invention. In particular, the amount of ED compound directly fed to step (b) should be higher than that used in step (a). Preferably, the weight ratio between the amount of ED used in step (b) and that used in step (a) is 2 or higher. The preferred ED compound is THF.

The above catalysts show, in addition to a high polymerization activity, also good morphological properties that make them particularly suitable for the use in the gas-phase polymerization process of the invention.

Also metallocene-based catalyst systems can be used in the process of the present invention and they comprise:

a) at least a transition metal compound containing at least one n bond;

b) at least an alumoxane or a compound able to form an alkylmetallocene cation; and c) optionally an organo-aluminum compound.

A preferred class of metal compound containing at least one n bond are metallocene compounds belonging to the following formula (I):

$$Cp(L)_qAMX_p \qquad (I)$$

wherein

M is a transition metal belonging to group 4, 5 or to the lanthanide or actinide groups of the Periodic Table of the Elements; preferably M is zirconium, titanium or hafnium;

the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms; preferably, the substituents X are selected from the group consisting of —Cl, —Br, -Me, -Et, -n-Bu, -sec-Bu, -Ph, -Bz, —$CH_2SiMe_3$, —OEt, —OPr, —OBu, —OBz and —$NMe_2$;

p is an integer equal to the oxidation state of the metal M minus 2;

n is 0 or 1; when n is 0 the bridge L is not present;

L is a divalent hydrocarbon moiety containing from 1 to 40 carbon atoms, optionally containing up to 5 silicon atoms, bridging Cp and A, preferably L is a divalent group $(ZR^7_2)_n$; Z being C, Si, and the $R^7$ groups, equal to or different from each other, being hydrogen or a hydrocarbon radical containing from 1 to 40 carbon atoms;

more preferably L is selected from $Si(CH_3)_2$, $SiPh_2$, $SiPhMe$, $SiMe(SiMe_3)$, $CH_2$, $(CH_2)_2$, $(CH_2)_3$ or $C(CH_3)_2$;

Cp is a substituted or unsubstituted cyclopentadienyl group, optionally condensed to one or more substituted or unsubstituted, saturated, unsaturated or aromatic rings;

A has the same meaning of Cp or it is a $NR^7$, —O, S, moiety wherein $R^7$ is a hydrocarbon radical containing from 1 to 40 carbon atoms;

Alumoxanes used as component b) are considered to be linear, branched or cyclic compounds containing at least one group of the type:

wherein the substituents U, same or different, are defined above.

In particular, alumoxanes of the formula:

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number; or alumoxanes of the formula:

can be used in the case of cyclic compounds, wherein $n^2$ is an integer from 2 to 40 and the U substituents are defined as above.

The ethylene polymers obtained by the process of the present invention are suitable to prepare a wide range of products, since they achieve an excellent balance of mechanical properties and processing properties. In particular, an excellent level of homogeneity is properties and processing properties. In particular, an excellent level of homogeneity is combined with high values of stress cracking resistance; furthermore, the broadening of the molecular weight distribution helps to achieve good processability and improved flow properties and shear response. In view of these properties, the ethylene polymers obtained by the process of the present invention can be injection or blow-molded into articles, extruded and blown into films or extruded into pipes.

A particularly preferred application is the preparation of pipes able to withstand high pressure. It is conventional to express the performance under stress of polyethylene (or any other thermoplastic) pipes by means of the hoop stress to which a pipe made of polyethylene (or any other thermoplastic) is expected to be able to withstand fifty years at an ambient temperature of 20° C., using water as the test environment (ISO/TR 9080:1992). By the process hereinbefore described, it is possible to obtain PE80 and PE100 pipes, i.e. polyethylene pipes able to withstand fifty years at an ambient temperature of 20° C. and a pressure of 8 and 10 MPa, respectively.

The process of the invention will now be described in greater detail with reference to the following examples, being in no way limitative of the object of the invention.

EXAMPLES

Characterization

The properties stated were determined according to the following methods:
Melt index E (MIE): ASTM-D 1238, condition 190/2,16
Melt index F (MIF): ASTM-D 1238, condition 190/21,6
Melt index P (MIP): ASTM-D 1238, condition 190/5
Ratio of degrees (F/P): ratio between melt index F and melt index P.
Density: ASTM-D 792.
Flexural elasticity modulus (MEF): the tests were carried out according to ASTM D-790.
Intrinsic viscosity (I.V.): in tetrahydronaphtalene at 135° C.
Stress cracking resistance according to full notch creep test (FNCT): a polymer sample (a small bar 10×10×100 mm), notched on four sides perpendicularly to the stress direction, was immersed in a water solution of ARCOPAL (2% by mole) at 95° C. A constant load of 4.5 MPa was applied to the sample lengthwise to determine the rupture time.

Examples 1-3

Preparation of the Solid Catalyst Component

The polymerization was carried out in the presence of a Ziegler-Natta catalyst comprising a solid catalyst component prepared with the procedure described in EP 541760 at page 7, lines 1-16.

Triethylaluminium (TEAL) as a cocatalyst, and methyl cyclohexyldimethoxysilane as an electron donor, were contacted with the above solid catalyst component according to the teaching given in Example 1 of EP 541760, lines 25-29. The molar ratio TEAL/Ti was of 100.

Process Setup

In examples 1-3 the process of the invention was carried out under continuous conditions in a plant comprising two serially connected gas-phase reactors, as shown in FIG. 1.

Example 1

The catalyst, prepolymerized with propylene, was fed via line 12 to the first gas-phase polymerization reactor of FIG. 1. In the first reactor ethylene was polymerized using $H_2$ as molecular weight regulator and in the presence of propane as inert diluent. The amounts of ethylene, hydrogen and propane are specified in Table 1. No comonomer was fed to the first reactor.

Make-up propane, ethylene and hydrogen as molecular weight regulator were fed via line 13. Ethylene and hydrogen were also fed directly into downcomer 2 via line 18.

The properties of the polyethylene resin prepared in the first reactor were analyzed. It can be seen from Table 1 that the polyethylene resin had a melt index MIE of about 120 g/10 min, this representing a relatively low molecular weight for the polymer and a relatively high density of 0.968 kg/dm³. The first reactor produced around 45% by weight (split wt %) of the total amount of the final polyethylene resin produced by both first and second reactors. The polymerization was carried out at a temperature of around 90° C. and at a pressure of around 3.0 MPa.

The polymer obtained in the first reactor was continuously discharged via line 11, separated from the gas into the gas/solid separator 19, and reintroduced into the connection section 5' of the second gas-phase reactor via line 21. The second reactor was operated under polymerization conditions at a lower temperature, of about 75° C., and a lower pressure, of about 2.1 MPa, than those employed in the first reactor.

As a comonomer, 1-hexene was introduced in the second reactor in the amount specified in Table 2. Make-up propane, ethylene and hydrogen were fed through line 13' into the recycling system, while 1-hexene and ethylene were fed directly to the downcomer 2' through line 29.

In order to broaden out the molecular weight distribution of the final ethylene polymer, the second reactor was operated by establishing different conditions of monomers and hydrogen concentration within the riser and the downcomer. This is achieved by feeding via line 27 a liquid stream (liquid barrier) into the upper part of the downcomer 2'. Said liquid stream has a composition different from that of the gas mixture present in the riser. Said different concentrations of monomers and hydrogen within the riser and the downcomer of the second reactor are indicated in Table 2, while the composition of the liquid barrier is indicated in Table 3.

The liquid stream of line 27 comes from the condensation step in the condenser 22, at working conditions of 50° C. and 2.1 MPa, wherein a part of the recycle stream is cooled and partially condensed. The liquid stream 27 can be enriched in 1-hexene by feeding it through line 23.

The final polymer was continuously discharged via line 11'.

The polymerization process in the second reactor produced relatively high molecular weight polyethylene fractions. In Table 5 the properties of the final product are specified. It can be seen that the melt index of the final product is decreased as compared to the ethylene resin produced in the first reactor, showing the formation of high molecular weight fractions in the second reactor. At the same time, the obtained polymer is endowed with a broad molecular weight distribution as witnessed by a ratio MIF/MIP equal to 25.7. The final product was then formed into a small bar (10×10×100 mm) which was subjected to the full notch creep test (FNCT) at a load of 4.5 MPa and a temperature of 95° C. The sample failed the test after about 130 hours, thus showing a high stress cracking resistance.

Examples 2-3

The process of the invention was carried out with the same setup and the same polymerization catalyst of Example 1.

In the first reactor the amounts of ethylene and propane were varied with respect to example 1 and a higher amount of polyethylene resin was produced (split %). The operative conditions in the first reactor are shown in Table 1.

The amount of the 1-hexene comonomer into the downcomer of the second reactor is slightly increased with respect to example 1. The operative conditions in the second reactor are shown in Table 2 and the composition of the barrier stream is shown in Table 3.

The properties of the final polymer are shown in Table 5. The obtained polyethylene resin was formed into a small bar (10×10×100 mm) which was then subjected to the full notch creep test (FNCT) as in example 1. The sample failed the test after about 207 hours (example 2) and about 140 hours (example 3), thus showing a high stress cracking resistance.

Example 4 (Comparative)

An apparatus comprising just one gas-phase polymerization reactor having interconnected polymerization zones was utilized. Said reactor has the same configuration of the second gas-phase reactor shown in FIG. 1.

The same catalyst used in example 1 was fed to the riser of said reactor. The temperature throughout the reactor was kept at about 90° C. and the pressure at about 3.0 MPa.

In order to broaden out the molecular weight distribution of the final ethylene polymer, said gas-phase reactor is operated by establishing different conditions of monomers and hydrogen concentration within the riser and the downcomer. This is achieved by feeding a liquid stream (liquid barrier) into in the upper part of the downcomer. The different operative conditions within the riser and the downcomer, and the composition of the liquid barrier are indicated in Table 4.

The properties of the final polymer are shown in Table 5. The obtained polyethylene resin was formed into a small bar (10×10×100 mm) which was then subjected to the full notch creep test (FNCT) as in example 1. The sample failed the test after only 6.1 hours, thus showing a poor stress cracking resistance.

Examples 5-7

Preparation of the Solid Catalyst Component

A magnesium chloride and alcohol adduct containing about 3 mols of alcohol was prepared following the method described in example 2 of U.S. Pat. No. 4,399,054, but working at 2000 RPM instead of 10000 RPM. The adduct were subject to a thermal treatment, under nitrogen stream, over a temperature range of 50-150° C. until a weight content of 25% of alcohol was reached.

Into a 500 mL four-necked round flask, purged with nitrogen, 250 mL of $TiCl_4$ were introduced at 0° C. Then, at the same temperature, 17.5 g of a spherical $MgCl_2$/EtOH adduct containing 25% wt of ethanol and prepared as described above were added under stirring. The temperature was raised to 130° C. in 1 h and maintained for 60 min. Then, the stirring was discontinued, the solid product was allowed to settle and the supernatant liquid was siphoned off.

The solid was washed six times with anhydrous hexane (5×100 mL) at 60° C. and once at 25° C. Finally, the solid was dried under vacuum and analyzed (Ti=4.9% wt; Mg=19.4% wt).

A solid so obtained was injected into an autoclave and kept at 30° C. stirring in anhydrous hexane (the concentration of the solid was 40 g/L) under nitrogen atmosphere. The suspension was treated with an amount of a 10% wt solution of tri-ethyl-aluminum (TEA) in hexane to achieve a ratio TEA/solid=0.5 wt/wt. An amount of propylene equal to the initial quantity of the solid was then slowly fed with a rate suitable to keep the temperature constant at 30° C. After 30 minutes the polymerization was stopped.

In a 500 mL four-necked round flask equipped with a mechanical stirrer and purged with nitrogen, 200 mL of anhydrous hexane and 10 g of the prepolymer obtained as described above were charged at room temperature. At the same temperature, under stirring an amount of ethyl acetate (AcOEt), as an internal donor, was added dropwise to achieve a molar AcOEt/Ti ratio of 8. The temperature was raised to 50° C. and the mixture was stirred for 3 hours. Then, the stirring was discontinued, the solid product was allowed to settle and the supernatant liquid was siphoned off.

The solid was washed 3 times with anhydrous hexane (3×100 mL) at 25° C., recovered, and dried under vacuum.

Process Setup

In examples 5-7 the process of the invention was carried out under continuous conditions in a plant comprising a fluidized bed reactor and a gas-phase reactor having interconnected polymerization zones, as shown in FIG. 2.

Example 5

The catalyst, prepolymerized with propylene, was fed to the fluidized bed reactor via line 34. In said reactor ethylene was polymerized with hydrogen in the presence of propane as inert diluent and the amounts of ethylene, hydrogen and propane are specified in Table 1. No comonomer was fed to the first reactor.

Make-up propane, ethylene and hydrogen as molecular weight regulator were fed via line 36.

The properties of the polyethylene resin prepared in the first reactor were analyzed. It can be seen from Table 1 that the polyethylene resin had a melt index MIE of about 120 g/10 min, this representing a relatively low molecular weight for the polymer and a relatively high density of 0.9681 kg/dm$^3$. The first reactor produced around 57% by weight (split wt %) of the total amount of the final polyethylene resin produced by both first and second reactors. The polymerization was carried out at a temperature of about 80° C. and at a pressure of about 2.4 MPa.

The obtained polymer was continuously discharged from the fluidized bed reactor via line 39, separated from the gas into the gas/solid separator 19, and introduced into the connection section 5' of the second gas-phase reactor via line 21. The second reactor was operated under polymerization conditions at a temperature of about 80° C., and a pressure of about 2.1 MPa.

As a comonomer, 1-hexene was introduced in the second reactor to obtain the concentration values specified in Table 2. Make-up propane, ethylene and hydrogen were fed through line 13' into the recycling system, while 1-hexene and ethylene were fed directly to the downcomer 2' through line 29.

In order to broaden the molecular weight distribution of the final ethylene polymer, the second reactor was operated by establishing different conditions of monomers and hydrogen concentration within the riser and the downcomer. This is achieved by feeding via line 27 a liquid stream (liquid barrier) into the upper part of the downcomer 2'. Said liquid stream has a composition different from that of the gas mixture present in the riser. Said different concentrations of monomers and hydrogen within the riser and the downcomer of the second reactor are indicated in Table 2, while the composition of the liquid barrier is indicated in Table 3.

The liquid stream of line 27 comes from the condensation step in the condenser 22, at working conditions of 53° C. and 2.1 MPa, wherein a part of the recycle stream is cooled and partially condensed. The liquid stream 27 can be enriched in 1-hexene by feeding it through line 23.

Tetrahydrofurane (THF) was also fed via line 23 into the downcomer 2' in a weight ratio THF/TEA of 0.02, where TEA is the tri-ethyl aluminum used for activating the catalyst.

The final polymer was continuously discharged via line 11'.

The polymerization process in the second reactor produced relatively high molecular weight polyethylene fractions. In Table 5 the properties of the final product are specified. It can be seen that the melt index of the final product is decreased as compared to the ethylene resin produced in the first reactor, showing the formation of high molecular weight fractions in the second reactor. At the same time, the obtained polymer is endowed with a broad molecular weight distribution as witnessed by a ratio MIF/MIP equal to 34.5. The final product was then formed into a small bar (10×10×100 mm) which was subjected to the full notch creep test (FNCT) at a load of 4.5 MPa and a temperature of 95° C. The sample failed the test after about 308 hours, thus showing a high stress cracking resistance.

Example 6

The process of the invention was carried out with the same apparatus and polymerization catalyst of example 5.

In the fluidized bed reactor the amounts of ethylene and propane was varied with respect to example 5 and a smaller amount of polyethylene resin was produced (split %). The operative conditions in the first reactor are shown in Table 1.

The amount of the 1-hexene comonomer into the downcomer of the second reactor is slightly increased with respect to example 5, resulting in a slightly lower density of the final product. The operative conditions in the second reactor are shown in Table 2 and the composition of the barrier stream is shown in Table 3. THF was fed via line 23 into the downcomer 2' with the same weight ratio of Example 5.

The properties of the final polymer are shown in Table 5. The changed split and slightly changed molecular weights resulted in a somewhat narrower molecular weight distributed, witnessed by a ratio MIF/MIP equal to 27.4. The obtained polyethylene resin was formed into a small bar (10×10×100 mm) which was then subjected to the full notch creep test (FNCT) as in the previous examples. The sample failed the test after about 425 hours, thus showing a very high stress cracking resistance.

Example 7

The process of the invention was carried out with the same apparatus and polymerization catalyst of example 5.

In the fluidized bed reactor the amounts of ethylene and propane were similar to those in Example 5 and 6. The production split of the first reactor was similar to the one of Example 6. The operative conditions in the first reactor are shown in Table 1.

Instead of 1-hexene, 1-butene was introduced as the comonomer in the second reactor to obtain the concentration values specified in Table 2. The operative conditions in the second reactor are shown in Table 2 and the composition of the barrier stream is shown in Table 3. THF was fed via line 23 into the downcomer 2' with the same weight ratio of Example 5.

The properties of the final polymer are shown in Table 5. Again, the obtained polyethylene resin was formed into a small bar (10×10×100 mm) which was then subjected to the full notch creep test (FNCT) as in the previous examples. The sample failed the test after about 152 indicating a high stress cracking resistance.

TABLE 1

First Reactor

| | Ex. 1 | Ex. 2 | Ex. 3 | Ex. 5 | Ex. 6 | Ex. 7 |
|---|---|---|---|---|---|---|
| Operative conditions | | | | | | |
| $H_2/C_2H_4$ Molar Ratio | 1.6 | 1.6 | 1.6 | 1.8 | 1.7 | 1.7 |
| $C_2H_4$ % | 12 | 14 | 14 | 13 | 14 | 14 |
| $C_3H_8$ % | 68 | 63 | 63 | 64 | 62 | 62 |
| Temp (° C.) | 90 | 90 | 90 | 80 | 80 | 80 |
| Pressure (MPa) | 3.0 | 3.0 | 3.0 | 2.4 | 2.4 | 2.4 |
| Split (wt %) | 45 | 52 | 51 | 57 | 50 | 49 |
| Polymer Properties | | | | | | |
| MIE (g/10') | 120 | 115 | 125 | 120 | 105 | 110 |
| Density (kg/dm$^3$) | 0.9680 | 0.9678 | 0.9684 | 0.9681 | 0.9687 | 0.9685 |
| I.V. (dl/g) | 0.73 | 0.75 | 0.70 | 0.70 | 0.73 | 0.72 |

TABLE 2

Second Reactor

| | Ex. 1 | Ex. 2 | Ex. 3 | Ex. 5 | Ex. 6 | Ex. 7 |
|---|---|---|---|---|---|---|
| Operative conditions | | | | | | |
| $H_2/C_2H_4$ riser | 0.12 | 0.1 | 0.12 | 0.06 | 0.06 | 0.07 |
| $C_2H_4$ % riser | 14 | 16 | 14 | 20 | 17 | 16 |
| $C_3H_8$ % riser | 84 | 82 | 84 | 87 | 81 | 82 |
| $C_4H_8$ % riser | — | — | — | — | — | 1.4 |
| $C_6H_{12}$ % riser | 1.2 | 1.4 | 1.1 | 1.0 | 1.1 | — |
| $H_2/C_2H_4$ downcomer | 0.07 | 0.06 | 0.07 | 0.06 | 0.04 | 0.05 |
| $C_2H_4$ % downcomer | 7 | 8 | 8 | 8 | 5 | 8 |
| $C_3H_8$ % downcomer | 90 | 88 | 89 | 90 | 92 | 91 |
| $C_4H_8$ % downcomer | — | — | — | — | — | 2.5 |
| $C_6H_{12}$ % downcomer | 2 | 2.5 | 2.2 | 1.2 | 2.1 | — |
| Temp (° C.) | 75 | 75 | 75 | 80 | 80 | 75 |
| Pressure (MPa) | 2.1 | 2.1 | 2.1 | 2.1 | 2.1 | 2.1 |

TABLE 3

Liquid Barrier

| | Ex. 1 | Ex. 2 | Ex. 3 | Ex. 5 | Ex. 6 | Ex. 7 |
|---|---|---|---|---|---|---|
| Barrier Feed (kg/h) | 200 | 200 | 200 | 150 | 150 | 150 |
| $C_2H_4$ % | 4 | 4 | 4 | 7 | 6 | 7 |
| $C_3H_8$ % | 92 | 92 | 92 | 90 | 91 | 91 |
| $C_4H_8$ % | — | — | — | — | — | 2.0 |
| $C_6H_{12}$ % | 3 | 3.5 | 3.2 | 2.6 | 2.7 | — |
| $H_2$ % | 0.04 | 0.03 | 0.04 | 0.08 | 0.06 | 0.07 |

TABLE 4

| | Comp. Example 4 |
|---|---|
| Operative conditions | |
| $H_2/C_2H_4$ riser | 1.7 |
| $C_2H_4$ % riser | 16 |
| $C_3H_8$ % riser | 56 |
| $C_6H_{12}$ % riser | 0.3 |
| $H_2/C_2H_4$ downcomer | 0.07 |
| $C_2H_4$ % downcomer | 7 |
| $C_3H_8$ % downcomer | 91 |
| $C_6H_{12}$ % downcomer | 1.1 |
| Temp (° C.) | 90 |
| Pressure (MPa) | 3.0 |
| Liquid barrier | |
| Barrier Feed (kg/h) | 220 |
| $C_2H_4$ % | 0.2 |
| $C_3H_8$ % | 98 |
| $C_6H_{12}$ % | 1.8 |
| $H_2$ % | 0.005 |

TABLE 5

Final polymer

| | Ex. 1 | Ex. 2 | Ex. 3 | Comp. Ex. | Ex. 5 | Ex. 6 | Ex. 7 |
|---|---|---|---|---|---|---|---|
| MIP (g/10') | 0.30 | 0.28 | 0.25 | 0.32 | 0.27 | 0.31 | 0.33 |
| MIF (g/10') | 7.7 | 8.7 | 7.6 | 9.0 | 9.3 | 8.5 | 10.8 |
| MIF/MIP | 25.7 | 31.1 | 30.4 | 28.0 | 34.5 | 27.4 | 32.7 |
| Density (Kg/dm$^3$) | 0.9480 | 0.9477 | 0.9490 | 0.9468 | 0.9520 | 0.9501 | 0.9484 |
| I.V. (dl/g) | 3.1 | 3.2 | 3.3 | 3.0 | 3.2 | 3.0 | 2.9 |
| MEF (Mpa) | 1042 | 1032 | 1080 | 940 | 1083 | 1089 | 1040 |
| Time for Failure (hrs) - FNCT @ 95° C., 4.5 Mpa | 130 | 207 | 140 | 6.1 | 308 | 425 | 152 |

The invention claimed is:

1. A process for preparing a broad molecular weight polyethylene by polymerizing ethylene in the presence of a polymerization catalyst, the process comprising the following steps, in any mutual order:
   a) polymerizing ethylene monomer, optionally together with at least one first α-olefinic comonomer having from 3 to 12 carbon atoms, in a first gas-phase reactor in the presence of a first amount of hydrogen, thereby forming an ethylene polymer;
   b) copolymerizing ethylene with at least one second α-olefinic comonomer having from 3 to 12 carbon atoms in a second gas-phase reactor in the presence of a second amount of hydrogen, wherein the second amount of hydrogen is less than the first amount of hydrogen;
   where in at least one of said gas-phase reactors growing polymer particles flow upward through a first polymerization zone (riser) under fast fluidization or transport conditions, leave said riser and enter a second polymerization zone (downcomer) through which they flow downward under the action of gravity, leave said downcomer and are reintroduced into the riser, thus establishing a circulation of polymer between said two polymerization zones,
      wherein the ethylene polymer obtained from step a) represents from 40 to 65% by weight of a total ethylene polymer produced in the overall process.

2. The process according to claim 1, wherein step a) is performed upstream step b).

3. The process according to claim 1, wherein the ethylene polymer obtained from step a) has a density higher than 0.955 kg/dm$^3$.

4. The process according to claim 1, wherein the ethylene polymer obtained from step a) has a melt flow rate MIE in the range of 10 to 400 g/10 min.

5. The process according to claim 4, wherein the MIE is from 100 to 200 g/10 min.

6. The process according to claim 1, further comprising in step a) a hydrogen/ethylene molar ratio between 0.5 and 5.0, and wherein the ethylene monomer is present in an amount from 5 to 50% by volume.

7. The process according to claim 1, wherein an operating temperature in step a) is selected between 50 and 120° C.

8. The process according to claim 1, wherein an operating pressure in step a) is between 0.5 and 10 MPa.

9. The process according to claim 1, wherein step a) is performed in a fluidized bed reactor.

10. The process according to claim 1, where step a) and b) are carried out in a sequence of two gas-phase reactors in which growing polymer particles flow upward through a riser under fast fluidization conditions, leave said riser and enter a downcomer through which they flow downward under the action of gravity, leave said downcomer and are reintroduced into the riser.

11. The process according to claim 1, wherein the ethylene polymer and entrained gas coming from step a) are passed through a solid/gas separator, thereby forming a separated polymer, and the separated polymer is fed to the reactor of step b).

12. The process according to claim 1, wherein an operating temperature in step b) is in the range from 65 to 95° C.

13. The process according to claim 1, wherein an operating pressure in step b) is in the range from 1.5 to 4.0 MPa.

14. The process according to claim 1, wherein the α-olefinic comonomer of step b) is selected from 1-butene, 1-pentene, 1-hexene, 4-methyl-1-pentene, 1-heptene and 1-octene.

15. The process according to claim 1, wherein the second reactor of step b) is operated by establishing different conditions of monomers and $H_2$ concentration within said riser and said downcomer.

16. The process according to claim 15, wherein said different conditions are achieved by feeding at least one of a gas and a liquid mixture into said downcomer, said at least one of a gas and liquid mixture having a composition different from that of a gas mixture present in said riser.

17. The process according to claim 15, further comprising a hydrogen/ethylene molar ratio in said downcomer of step b) of between 0.005 and 0.2, and an ethylene concentration is from 1 to 20% by volume.

18. The process according to claim 15, wherein a comonomer concentration in said downcomer of step b) is from 0.3 to 5% by volume based on a total volume of gas present in said downcomer.

19. The process according to claim 15, further comprising a hydrogen/ethylene molar ratio in said riser of step b) of between 0.05 and 0.3, and an ethylene concentration from 5 to 15% by volume.

20. The process according to claim 15, wherein a comonomer concentration in said riser of step b) is from 0.1 to 3.0% by volume based on a total volume of gas present in said riser.

* * * * *